United States Patent
Akhter et al.

(10) Patent No.: US 9,544,282 B2
(45) Date of Patent: *Jan. 10, 2017

(54) CHANGING GROUP MEMBER REACHABILITY INFORMATION

(71) Applicant: Cisco Technology, Inc., San Jose, CA (US)

(72) Inventors: Aamer S. Akhter, Cary, NC (US); Rajiv Asati, Morrisville, NC (US); Brian Weis, San Jose, CA (US); Mohamed Khalid, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/983,001

(22) Filed: Dec. 29, 2015

(65) Prior Publication Data
US 2016/0134606 A1 May 12, 2016

Related U.S. Application Data

(63) Continuation of application No. 14/681,602, filed on Apr. 8, 2015, now Pat. No. 9,253,172, which is a continuation of application No. 13/797,595, filed on Mar. 12, 2013, now Pat. No. 9,027,114.

(51) Int. Cl.
| | |
|---|---|
| *H04L 29/06* | (2006.01) |
| *G06F 15/16* | (2006.01) |
| *H04L 9/08* | (2006.01) |
| *H04L 29/12* | (2006.01) |

(52) U.S. Cl.
CPC ........... *H04L 63/065* (2013.01); *H04L 9/0833* (2013.01); *H04L 9/0891* (2013.01); *H04L 63/0272* (2013.01); *H04L 63/0428* (2013.01); *H04L 61/2076* (2013.01)

(58) Field of Classification Search
None
See application file for complete search history.

(56) References Cited

U.S. PATENT DOCUMENTS

| | | |
|---|---|---|
| 6,976,177 B2 | 12/2005 | Ahonen |
| 7,558,877 B1 | 7/2009 | Fedyk et al. |
| 7,926,098 B2 | 4/2011 | Chinitz et al. |
| 7,984,494 B2 | 7/2011 | Yoshizawa et al. |
| 8,244,894 B1 | 8/2012 | Zhao et al. |
| 8,924,718 B2 | 12/2014 | Janakiraman et al. |

(Continued)

OTHER PUBLICATIONS

U.S. Appl. No. 14/681,602, filed Apr. 8, 2015, Office Action, Aug. 11, 2015.

(Continued)

*Primary Examiner* — Christopher Revak
(74) *Attorney, Agent, or Firm* — Hickman Palermo Becker Bingham LLP; Malgorzata A. Kulczycka

(57) ABSTRACT

In an embodiment, a method comprises obtaining a second network address at a computer node, which has been already associated with a first network address and provided first keying information; sending, to a key server computer, an update message that comprises both the first network address and the second network address; using the first keying information to encrypt messages that the computer node sends from the second network address to one or more other members of a group.

20 Claims, 8 Drawing Sheets

(56) References Cited

U.S. PATENT DOCUMENTS

| | | | |
|---|---|---|---|
| 9,027,114 | B2 | 5/2015 | Akhter et al. |
| 9,253,172 | B2 * | 2/2016 | Akhter .................. H04L 9/0833 |
| 2002/0147820 | A1 | 10/2002 | Yokote |
| 2002/0157024 | A1 | 10/2002 | Yokote |
| 2003/0212912 | A1 | 11/2003 | Bajko et al. |
| 2006/0031922 | A1 | 2/2006 | Sakai |
| 2008/0298592 | A1 | 12/2008 | Khalid |
| 2009/0133102 | A1 | 5/2009 | Wen et al. |
| 2009/0307485 | A1 | 12/2009 | Weniger et al. |
| 2010/0115109 | A1 | 5/2010 | Morimoto et al. |
| 2010/0142711 | A1 | 6/2010 | Weis et al. |
| 2011/0035585 | A1 | 2/2011 | Haddad |
| 2012/0216033 | A1 | 8/2012 | Ogata et al. |
| 2014/0040618 | A1 | 2/2014 | Liu et al. |
| 2014/0198728 | A1 | 7/2014 | Zhou et al. |
| 2014/0281508 | A1 | 9/2014 | Akhter et al. |
| 2015/0012971 | A1 | 1/2015 | Ram et al. |
| 2015/0215298 | A1 | 7/2015 | Akhter et al. |

OTHER PUBLICATIONS

U.S. Appl. No. 14/681,602, filed Apr. 8, 2015, Notice of Allowance, Oct. 19, 2015.

U.S. Appl. No. 13/797,595, filed Mar. 12, 2013, Office Action, Sep. 15, 2014.

U.S. Appl. No. 13/797,595, filed Mar. 12, 2013, Notice of Allowance, Jan. 15, 2015.

European Patent Office, "Search Report" in Application No. 14159297.2-1870, dated Jan. 5, 2015, 12 pages.

European Patent Office, "Search Report" in application No. 14159297.2-1870, dated Aug. 5, 2014, 5 pages.

European Claims in Application No. 14159297.2-1870, dated Jan. 2015, 3 pages.

Claims in European application No. 14159297.2-1870, dated Aug. 2014, 5 pages.

* cited by examiner

CHANGING GROUP MEMBER REACHABILITY INFORMATION

BENEFIT CLAIM

This application claims the benefit under 35 U.S.C. §120 as a continuation of application Ser. No. 14/681,602, filed Apr. 8, 2015, which is a continuation of patent no. 9,027,114 B2, issued on May 5, 2015, the entire contents of which are hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

TECHNICAL FIELD

The present disclosure is generally related to data communications between group members in dynamic group virtual private networks.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In a group of network devices, each device may have one or more network identities that serve as a locator or unique identifier of the device. Network identities may be static, which means that the identities are not expected to change, or dynamic, which means that the identities may change unexpectedly. Examples of network identity include Internet Protocol version 4 (IPv4) addresses and IPv6 addresses.

A Dynamic Group VPN (DGVPN) allows authorized devices, each having an assigned network identity, to securely communicate with each other even in situations where setting up a mesh of pair-wise security associations is challenging. A DGVPN may be configured, for example, using Cisco GETVPN technology commercially available from Cisco Systems, Inc., San Jose, Calif.

In a DGVPN, a Group Member (GM) may register to a key server computer (KS) and may obtain group security associations to encrypt and decrypt communications exchanged with other members. A group association need not be specific to a network identity of the GM. From the perspective of the DGVPN, once the GM registration process is finished, the network identity of the GM is immaterial.

However, from the perspective of a KS, a network identity of a GM may matter. For example, a KS may use a network identity of a GM to disseminate rekey messages to the GM. Consequently, conventional key servers, including those that implement a DGVPN, usually rely on static network identities for the GMs.

Relying on static network identities of GMs may impede the expansion of a DGVPN to provide support for static or mobile nodes, whose network identities may dynamically change. By their nature, mobile nodes may dynamically acquire different network identities as they move from one network to another. In that case, a conventional KS relying on a static network identity may be unable to deliver rekeying information to such nodes acting as the GMs. Subsequently, the mobile GM may become isolated from the group, upon its existing key expiration. It is worth pointing out that while multicast based rekey distribution could avoid KS having to rely on the network identities of GMs, distributing multicast rekey messages is not always possible because a coherent multicast routing may not be implementable within the network.

SUMMARY OF THE INVENTION

The appended claims may serve as a summary of the invention.

DESCRIPTION OF EXAMPLE EMBODIMENTS

Figure 1:
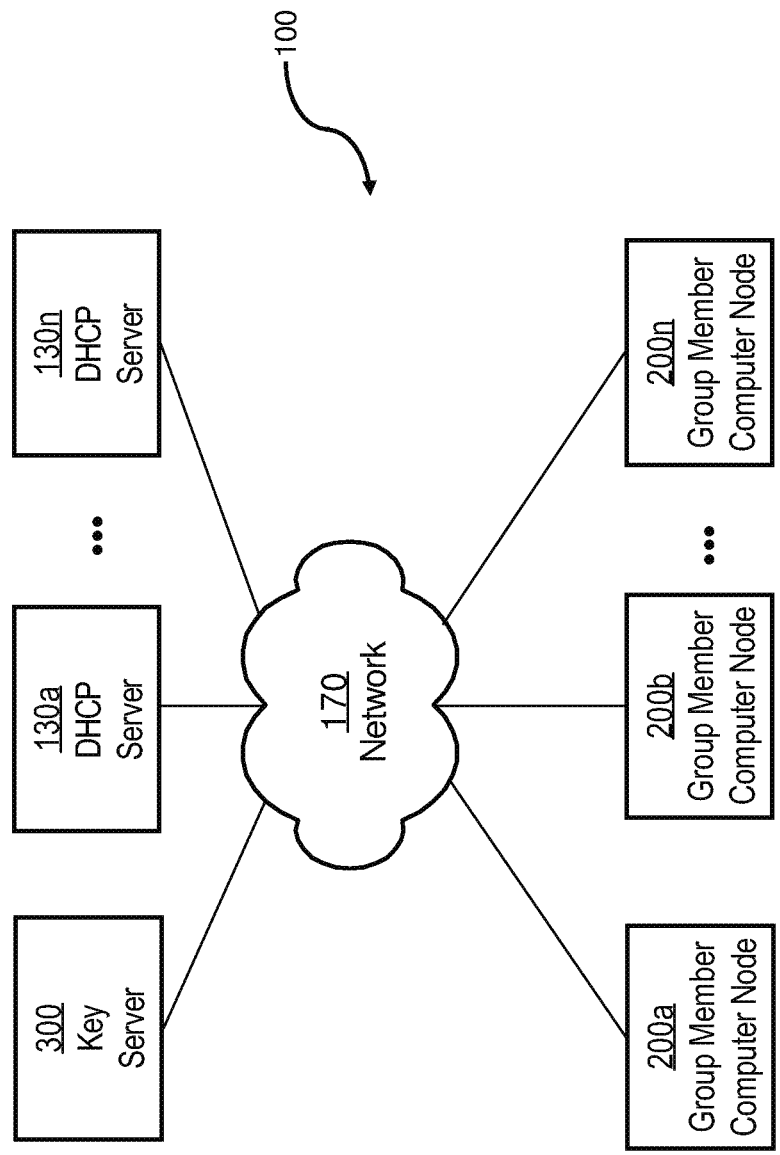
FIG. 1 illustrates an example system implementing a method for changing group member reachability information.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 Overview
2.0 Structural and Functional Overview
3.0 Group Member State Entry
4.0 Update Message
5.0 Example of Communications Between Group Members and Servers
6.0 Example Method for Changing Group Member Reachability Information
7.0 Example Method for Changing Group Member Reachability Information
8.0 Implementation Mechanisms—Hardware Overview
9.0 Extensions and Alternatives
1.0 Overview A method for changing group member reachability information is presented. In an embodiment, a computer node and a key server computer are configured to dynamically update their records for a network identity of the computer node. The updating may be performed without causing the key server computer to create a new security association (SA). In particular, a computer node may be configured to notify a key server computer of a change of the computer node's network identity without causing the key server computer to create a new security association each time the identity update from the computer node is received.

A computer node may be any type of computing device configured to communicate with other devices. Examples of a computer node include any type of a mobile group member, a mobile computing device such as a laptop computer, tablet computer or smart phone, or any other computing device configured to dynamically change its own identity.

A key server computer may be any type of key server configured to maintain security policies, authenticate computer nodes, and provide session keys and rekey messages to computer nodes.

Portions of this description may assume that a computer node has been already registered with a key server computer, and that after registration, the computer node and the key server computer do not maintain a persistent secure point-to-point communications channel or pair-wise security association. A registration process may have started, for example, with a computer node transmitting to a key server computer a first network address and requesting that the key server computer create a security association for the computer node. In response to receiving the request, the key server computer may create a security association for the computer node, add the first network address to a list of current group member network identities for a given group, and transmit a Group Security Association (GSA) to the computer node. Then, using a secure connection between a key server computer and a computer node, the key server computer may transmit to the computer node first keying information, which the computer node may decrypt using the GSA, as well as a shared secret value for use in securing later ad hoc messages, as further described herein for particular embodiments. Subsequently, the key server computer may tear down the pair-wise security association and delete state information created for the computer node. In addition, or in alternative to the key server computer tearing down the security association, the computer node may tear down the security association maintained by the computer node. As a result, the key server computer and the computer node no longer have an encrypted or secure persistent point-to-point communication channel; both the key server computer and the computer node may store the shared secret value, but that value itself does not represent a secure persistent point-to-point communication channel within the context of this disclosure. Various implementations of this step are described later.

In an embodiment, after a computer node registered with a key server computer and joined the membership group, the computer node may request and obtain a second network address. For example, upon leaving a first wireless network and entering a second wireless network, the computer node may request a second network address from an access point or address assignment computer. The second network address and a first network address may be obtained using Dynamic Host Configuration Protocol (DHCP), or from Point-to-Point Protocol (PPP), or Stateless Auto Address Configuration (SLAAC) etc. In response to the request, the computer node may receive the second network address, which the computer node may use within the second wireless network, eventually discarding or ceasing use of the first network address.

A first network address and a second network address are merely examples of network identities that a computer node may use to identify itself to other devices, including a key server computer. Generally, a network identity of a computer node may be represented by an IP address of the computer node, a MAC address of the computer node, or any other identifier that uniquely identifies the computer node to the key server computer and other nodes within a membership group.

Upon receiving a second network address, a computer node may create an update message, and send the update message to a key server computer. The update message may comprise the first network address and the second network address. The update message may also comprise the shared secret for the purpose of authenticating the update message. Examples of methods of packaging the shared secret include a cookie that is unique to the computer node or secret code that has been assigned to the computer node.

In an embodiment, sending an update message to a key server computer does not cause the key server computer to establish a new secure connection with a computer node. However, sending the update message to the key server computer may cause the key server computer to authenticate the sender of the update message based on the shared secret and then to replace, in storage of the key server computer, a first network address with a second network address, and to use the second network address to distribute rekey messages to the computer node.

Subsequent to sending the update message, the computer node may receive second keying information from the key server computer. The second keying information may differ from the first keying information.

Both first keying information and second keying information may be secured using the same GSA. A computer node may accept each of the first keying information and the second keying information using the GSA.

In an embodiment, an approach for changing group member reachability information may be implemented as an extension to a DGVPN. The extension may allow including mobile devices into a DGVPN-based network. Furthermore, it may allow distribution of rekeying information to mobile member nodes, which without receiving the rekeying information would drop out from a membership group. Moreover, the extension may provide full compatibility with legacy implementation of the DGVPN because it may provide support to both mobile devices and non-mobile devices, and handle static and dynamic network addresses of the group members.

In an embodiment, an approach for changing group member reachability information allows maintaining integrity of a DGVPN-based network with fewer demands on bandwidth and computation power. Implementations of the approach may rely on generating, transmitting and processing relatively uncomplicated update messages, thus placing little demand on the bandwidth and computer resources. Furthermore, combining the approach for changing group member reachability information with the approach for stateless security associations may lower demands on the bandwidth and computation power.

The foregoing and other features and aspects of the disclosure will become more readily apparent from the following detailed description of various embodiments.

2.0 Structural and Functional Overview

FIG. 1 illustrates an example system 100 implementing a method for changing group member reachability information. In an embodiment, a system 100 comprises a plurality of computer nodes 200a, 200n, one or more networks 170, one or more key server computers 300, and one or more DHCP servers 130a, 130n. Since PPP, SLAAC, PCO are examples of alternatives to DHCP and commonly used for address assignments, servers 130a, 130n may implement any of PPP, SLAAC or PCO as alternatives to DHCP.

In an embodiment, computer nodes 200*a*, 200*n* are members of a group.

For the purpose of illustrating clear examples, FIG. 1 shows three (3) computer nodes 200*a*, 200*b* and 200*n*. However, the embodiments may use any number of computer nodes 200*a*, 200*n*, as implied by the label n used for node 200*n*. Furthermore, for the purpose of illustrating clear examples, FIG. 1 shows that computer nodes 200*a*, 200*n* communicate with other devices via a network 170. However, in some embodiments, some computer nodes may communicate with each other directly, some other nodes may communicate with each other via a plurality of networks 170, and yet other nodes may communicate with each other via other devices, such as routers, switches or hubs. Moreover, embodiments may use any number of DHCP servers 130*a*, 130*n*, and any number of networks 170.

Computer nodes 200*a*, 200*n* may belong to one or more membership groups, and may be configured to communicate within the groups via a network 170. For example, computer nodes 200*a*, 200*n* may belong to one or more Virtual Private Network (VPN) group, and may implement the Group Domain of Interpretation (GDOI) cryptographic protocol for the group key management. The GDOI protocol is based on Internet Security Association and Key Management Protocol (ISAKMP) and Internet Key Exchange (IKE). While IKE is used to secure communications and establish a pair-wise security association between two members, GDOI protocol is used to secure communications between two or more members forming a group.

GDOI interprets IKE or ISAKMP for a group security domain. Members of a particular GDOI-based VPN group may share keying information, such as public encryption keys. Keying information may be distributed to members of a group in accordance with the GDOI protocol. Group members may use the keying information to encrypt and decrypt data exchanged with other members of the group.

Computer nodes 200*a*, 200*n* may be network infrastructure elements configured within a distributed network environment, and may include mobile and non-mobile computer nodes. A mobile computer node is a node that is configured to communicate with other devices and dynamically change its own identity, such as a network address, device identifier or any other type of identifier associated with the node. Examples of mobile computer nodes include vehicles with computers, ad-hoc mobile network devices, smart phones, tablet computers, and handheld computers.

A non-mobile computer node is a node that is configured to communicate with other devices. In an embodiment, a non-mobile computer node is configured to dynamically change its own identity. Non-limiting examples of non-mobile nodes include workstations, desktop computers and other devices.

A key server computer 300 may be configured to manage security issues for computer nodes 200*a*, 200*n*. In particular, key server computer 300 may be configured to maintain security policies for computer nodes 200*a*, 200*n*, authenticate the computer nodes, provide session keys to the computer nodes, and transmit rekey information to the computer nodes. Furthermore, key server computer 300 may be configured to accept registrations from computer nodes 200*a*, 200*n*, and authenticate the computer nodes at the time of the registration. Moreover, upon a successful registration of the computer nodes 200*a*, 200*n*, key server computer 300 may distribute key information to the computer nodes, receive an update message from the computer nodes, and distribute rekey information to the computer nodes.

The key server computer 300 may also be configured to send a GSA to computer node 200*a*, and use the GSA to encrypt keying information transmitted to computer node 200*a*. Computer node 200*a* may use the GSA to decrypt the keying information received from key server computer 300.

In an embodiment, upon sending keying information to computer node 200*a*, key server computer 300 may delete or tear down a SA created for computer node 200*a*.

The key server computer 300 may also be configured to receive and process update messages received from computer nodes 200*a*, 200*n*. For example, upon receiving an update message from computer node 200*a*, key server computer 300 may parse the received update message, determine that the update message was sent to key server computer 300 to notify key server computer 300 that computer node 200*a* dynamically changed its own network identity, and use the new network identity of computer node 200*a* to send rekeying information to computer node 200*a*.

One or more networks 170 may be configured to facilitate communications between computer nodes 200*a*, 200*n*, key server computer 300, and DHCP servers 130*a*, 130*n*. Network 170 may comprise one or more wide-area networks (WAN), one or more wireless local area networks (WLAN), one or more local-area networks (LAN), one or more Ethernet networks, or any other computer networks. Network 170 may provide support for a VPN, and may implement the information exchange according to any data communications protocol, such as the Transmission Control Protocol/Internet Protocol (TCP/IP). Network 170 may provide wireless support via Wi-Fi technology and implement communications standards such as the fourth generation of mobile phone mobile communication standard (4G), the third generation (3G) standard, or any other IEEE 802.16 standards.

DHCP servers 130*a*, 130*n* may be configured to implement DHCP, and may be configured to provide network addresses to computer nodes 200*a*, 200*n*. For example, a DHCP server 130 may provide an IP address, a default route and one or more domain Name system (DNS) server addresses to a DHCP client implemented in computer node 200*a*. A DHCP client of computer node 200*a* may use the IP address, default route and DNS addresses to configure the computer node to communicate with other devices in system 100.

A DHCP server 130 may maintain a database of available IP addresses and configurations. In some implementations, a DHCP server 130*a* grants IP addresses to a client only of a limited period of time. Before the expiration of that period of time, a client may renew the IP address, or request a new IP address; otherwise, upon the expiration of that period of time, the client may be unable to use the IP address which expired.

DHCP servers 130*a*, 130*n* may provide support for IPv4 and IPv6. Those DHCP servers 130 that support IPv4 may use link-local addressing, while those DHCP servers 130 that support IPv6 may use stateless address auto configuration.

In an embodiment, each DHCP server 130*a*, 130*n* is configured to distribute addresses for a particular sub-network contained in network 170. For example, DHCP server 130*a* may be configured to distribute addresses to nodes in a first sub-network, while DHCP server 130*b* may be configured to distribute addresses to nodes in a second sub-network.

Depending on implementations, DHCP server 130 may allocate IP addresses to computer nodes 200*a*, 200*n* using a variety of methods, including a dynamic allocation, an automatic allocation, a static allocation or any other method known in the industry.

Figure 2:
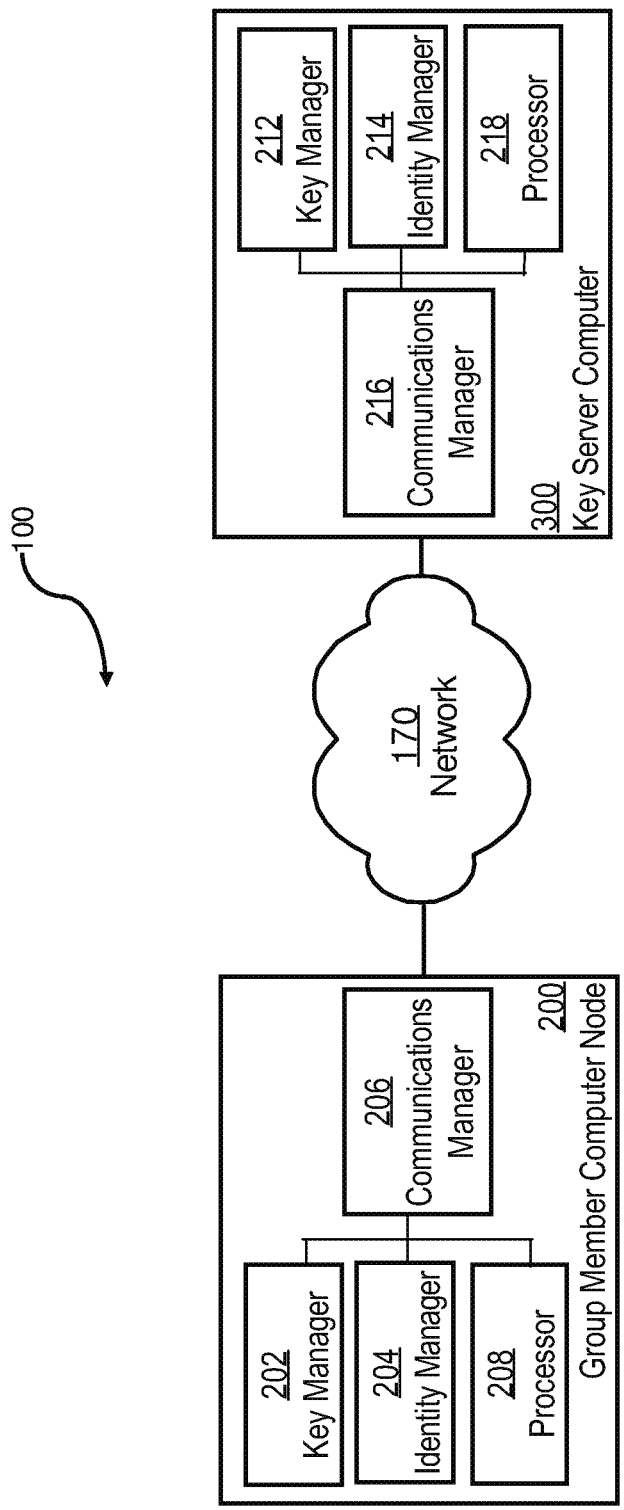
FIG. 2 illustrates an example system implementing a method for changing group member reachability information.

FIG. 2 illustrates an example system 100 implementing a method for changing group member reachability information. In an embodiment, a system 100 comprises a group member computer node 200, a key server computer 300 and a network 170.

A computer node 200 may be any of the computer nodes 200a, 200n of FIG. 1 and key server computer 300 may be any of the key server computers 300a, 300n of FIG. 1.

In an embodiment, a computer node 200 comprises a key manager 202, an identity manager 204, a communications manager 206 and a processor 208. In some embodiments, a computer node 200 may comprise additional components not depicted in FIG. 2. Alternatively, a computer node 200 may comprise some, but not all components, depicted in FIG. 2. Each of the key manager 202, identity manager 204, and communications manager 206 may be implemented using one or more computer programs or other software elements, firmware, programmed circuits, hardware logic, or any combination of the foregoing. The processor 208 may comprise a microprocessor or other central processing unit having one or more processor cores. Processor 208 may comprise hardware and software logic configured to execute various processes on a router or switch, and use hardware logic such as in an application-specific integrated circuit (ASIC), field-programmable gate array (FPGA), system-on-a-chip (SoC) or other combinations of hardware, firmware and/or software.

The identity manager 204 may be configured to request identity information from a DHCP server, receive the identity information from the DHCP server, and register the identity information with a key server computer 300. Identity information may comprise a network identity address, such as an IP address. Identity information is further described herein in connection with step 610 of FIG. 6.

Registration of identity information with a key server 300 may involve sending the identity information of computer node 200 to the key server computer 300, and causing the key server computer 300 to determine whether the provided identity information is valid. Registration is further described herein in connection with step 620 of FIG. 6.

The identity manager 204 may also be configured to request new identity information from a DHCP server. New identity information may be needed when computer node 200 enters a new network or when for some reason the previously received network identity becomes outdated. New identity information is further described herein in connection with step 660 of FIG. 6.

Upon receiving new identity information, the identity manager 204 may generate an update message, and send the update message to key server computer 300. An update message is a message used by computer node 200 to notify key server computer 300 that computer node 200 changed its own identity. An update message may be represented in a variety of formats. Examples of an update message are described further herein in connection with FIG. 4.

The key manager 202 may be configured to receive keying information from a key server computer 300. Keying information is the information that computer node 200 may use to encrypt the communications that computer node 200 sends to other members of the group and to decrypt communications that computer node 200 receives from other members of the group. Keying information may include pair-wise keys, public keys, private keys and any other code or data that computer node 200 may use to encrypt and decrypt communications. Keying information is further described herein in connection with step 630 of FIG. 6.

The key manager 202 may also be configured to receive rekeying information from key server computer 300. Rekeying information is usually distributed when keying information for the group or some members of the group needs to be updated. Rekeying information is usually distributed to prevent the members from a breach of security and to maintain integrity of the members of the group. Rekeying information is further described herein in connection with step 680 of FIG. 6.

The communications manager 206 may be configured to facilitate communications between components of a computer node 200, and to facilitate communications between the computer node and other devices in system 100. For example, the communications manager 206 may provide support for communicating messages, packets and segments to and from computer node 200, establishing various communications sessions for and on behalf of the computer node, negotiate and implement security policy for the computer node, and provide other type of functionality for the computer node.

The processor 208 may be configured to execute commands and instructions for implementing roles or functions assigned to components of a computer node 200. For example, processor 208 may facilitate communications to and from the computer node 200, process commands received by and executed by the computer node 200, process responses received by the computer node 200, and facilitate various types of operations executed by the computer node 200.

In an embodiment, key server computer 300 comprises a key manager 212, an identity manager 214, a communications manager 216 and a processor 218. In some embodiments, the key server computer 300 may comprise additional components not depicted in FIG. 2. Alternatively, the key server computer 300 may comprise some components of FIG. 2.

The identity manager 214 may be configured to register computer node 200, authenticate the computer node at the time of the registration, and upon a successful registration of the computer node, transmit a request to the key manager 212 to distribute key information to the computer node.

Registration with key server computer 300 allows computer node 200 to obtain keying information and current security policy implemented for the group to which the computer node belongs. The identity manager 214 may register computer node 200 each time the identity manager receives a registration request from the computer node. In the registration request, computer node 200 may provide a network identifier of the computer node. Identity manager 214 may verify whether the network identifier is valid and whether computer node 200 is a member of a particular group. A network identifier of computer node 200 is valid if the computer node provided valid IKE or GDOI credentials, and it may be represented by an IP address, a MAC address, or any other identifier that uniquely identifies the computer node to key server computer 300. Upon determining that the network identifier is valid, identity manager 214 may request that the key manager 212 create a security association (SA) for the computer node 200, and send SA policy and keying information to the computer node.

The identity manager 214 may also be configured to receive an update message from computer node 200, and request that the key manager 212 distribute rekey information to the computer node using the updated identity information of the computer node. In an embodiment, receiving an update message from computer node 200 indicates to identity manager 214 that the computer node changed its own identity information from an old network identifier to a new network identifier. The change of the identity information of computer node 200 may occur when the computer node relocates from a region, in which the old network identifier was valid, to another region, in which the new network identifier is valid.

In an embodiment, upon receiving an update message from computer node 200, the identity manager 214 does not establish a new SA for the computer node. Since establishing a new SA for computer node 200 would require key server computer 300 to allocate some resources and some time, omitting this step improves the performance and efficiency of the key server computer.

In an embodiment, upon receiving an update message from computer node 200, instead of establishing a new SA for the computer node, the identity manager 214 replaces an old network identity stored for the computer node by key server computer 300 with a new network identity for the computer node. The replacements may involve retrieving information associated with the computer node from a storage device accessible to key server computer 300, replacing the old network identity with the new network identity, and storing the updated information associated with the computer node in the storage device.

The key manager 212 may be configured to manage security policies for a computer node 200, other computer nodes. For example, the key manager 212 may create a SA for computer node 200, and send SA policy and keying information to the computer node.

The key manager 212 may also send security policy updates and rekey messages to computer node 200. The key manager 212 may send a rekey message to a computer node 200 for a variety of reasons. For example, key manager 212 may send a rekey message to computer node 200 when an IPSec SA associated with the computer node is about to expire, or when the security policy for the computer node (or the group to which it belongs) has changed for some reason.

Rekey messages may be used to distribute rekeys, and may be sent using either multicast or unicast message distribution methods.

The communications manager 216 is configured to facilitate communications between components of key server computer 300, and between the key server computer and other devices in system 100. For example, a communications manager 216 may provide support in communicating messages, packets and segments to and from key server computer 300, establishing various communications sessions for and on behalf of the key server computer, negotiate and implement security policy for the key server node and provide other types of functionality for the key server computer.

The processor 218 may be configured to execute commands and instructions for implementing roles or functions assigned to components of a key server computer 300. For example, processor 218 may facilitate communications to and from the key server computer 300, process commands received by and executed by the key server computer, process responses received by the key server computer, and facilitate various types of operations executed by the key server computer. Processor 218 may comprise hardware and software logic configured similarly to those of processor 208.

3.0 Group Member State Entry

Figure 3:
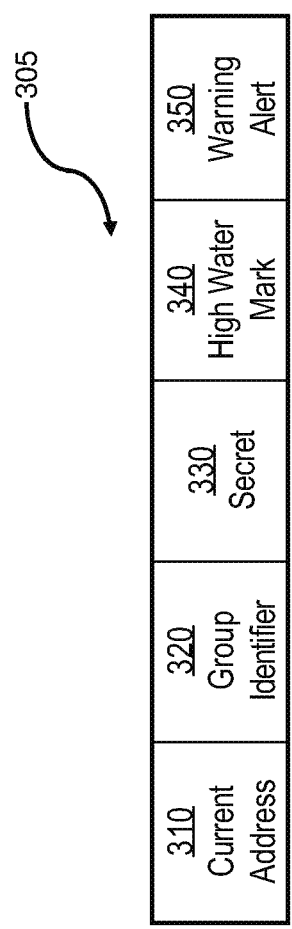
FIG. 3 illustrates an example group member state entry.

FIG. 3 illustrates an example group member state entry 305. A group member state entry 305 is an entry that may be stored in a state data repository maintained or accessible to computer nodes and key servers. A state database may be used to store information about SAs established and maintained for group members. For example, the key server computer 300 of FIG. 1 may maintain a state database for storing SA information for current members serviced by the key server computer 300. The computer nodes 200a, 200n of FIG. 1 may also maintain a state database for storing SA information created for the computer nodes by the key server computer 300. The state database may be organized as a table comprising one or more entries 305, or as any other data structure configured to store data.

An entry 305 may be associated with a group member computer node, such as a computer node 200, and may comprise several fields.

In an embodiment, the entry 305 comprises a current address field 310, a group identifier field 320, a secret field 330, a limit field 340 and a warning alert threshold field 350. In other embodiments, an entry 305 may comprise other fields, not depicted in FIG. 3. In yet other embodiments, an entry 305 may comprise fields that store pointers to other entries of an SA that is associated with the group member.

The current address field 310 may be used to store a value that represents a network identifier associated with a group member. A network identifier may be represented as an IP address, a MAC address, or any other identifier of the group member. The address may be distributed to the group member by DHCP server 130, and communicated to a key server computer by the group member. The address may be used by the group member to identify the group member to other devices. The address may be also used by others to send communications to the group member.

The group identifier field 320 may be used to store a value that represents a group identifier associated with a group to which a group member belongs. A group identifier may be represented by a GDOI-based VPN group identifier, or any other group identifier uniquely identifying a membership group to a key server computer.

The secret field 330 may be used to store a value that represents a "secret" shared between a group member and a key server computer. A secret may be represented by a cookie, an alphanumeric string, a secret key, a public key, a private key, an encryption algorithm or any type of value exchanged between the group member and the key server computer. The key server computer may use the secret to authenticate messages originated from the group member. The secret may be used in combination with a message authentication code algorithm to generate a message authentication code (MAC). The MAC may be used by a key server computer to authenticate messages sent by the group member.

The limit field 340 may be used to store a value that represents a limit threshold for update messages received from a group member. A limit value for the update messages may be used to determine if a group member is sending too many update messages to a key server computer, and if so, take an appropriate action. For example, if the quantity of update messages received from a particular group member within a certain period of time exceeds the limit value, then a key server computer may conclude that the particular group member is operating improperly or potentially malicious, and may take responsive action, including but not limited to refusing update messages or excluding the particular group member from a particular membership group.

The warning alert threshold field 350 holds a value that represents a warning threshold for update messages received from a group member. A warning alert threshold may be used to determine whether the group member is sending invalid update messages within a certain period of time, and if so, take an appropriate action. For example, if a quantity of invalid update messages received by a key server computer from a particular group member within a certain period of time exceeds the warning alert threshold value, then the key server computer may issue a warning message to other group members, indicating that the particular group member is sending invalid update messages. That may alert the group members of a potential spoofing of the particular group member, and indicate that communications with the particular group member may be pursued with caution.

4.0 Update Message

Figure 4:
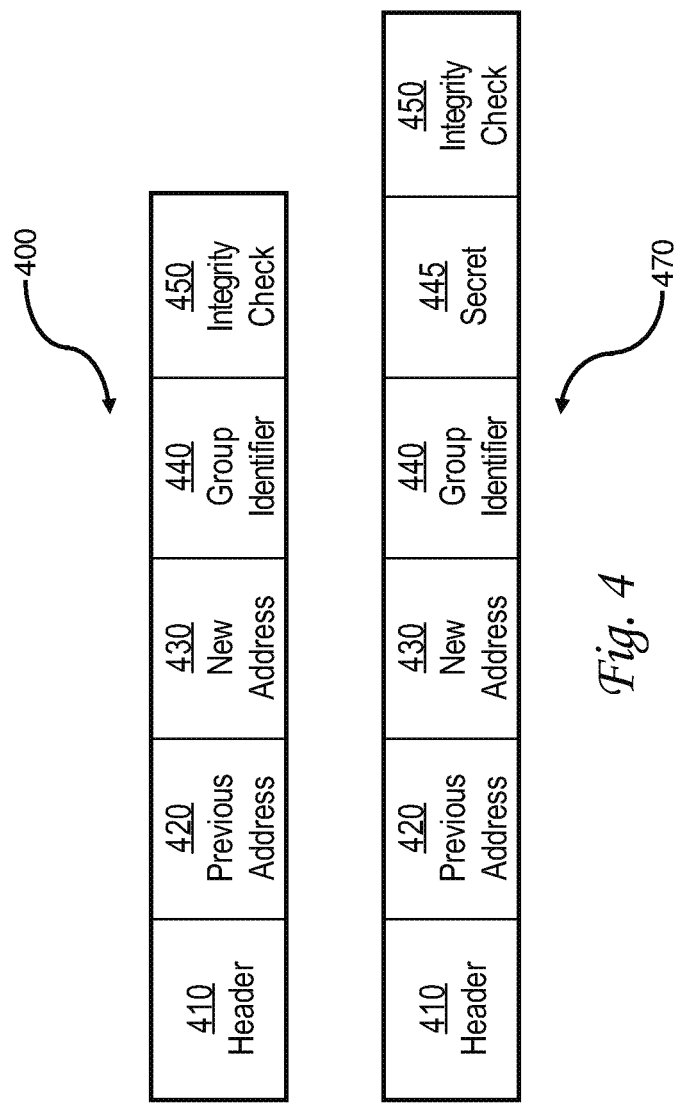
FIG. 4 illustrates example update messages for changing group member reachability information.

FIG. 4 illustrates example update messages 400, 470 for changing group member reachability information. In this context, an update message notifies a key server computer that the computer node changed group member reachability information. An update message may be created by a computer node each time when the computer node 200a, 200n receives new network identity information. The computer node may receive the new network identity information from a DHCP server configured to provide network identity information to computer nodes requesting the identity information.

In an embodiment, sending an update message from a computer node to a key server computer does not cause the key server node to establish a new SA for the computer node. As discussed above, omitting establishing a new SA for the computer node improves performance and efficiency of the key server computer.

In an embodiment, upon receiving an update message from a computer node, the key server computer updates the data stored by the key server computer for that computer node. The updating may involve deleting the previous network identity information from a data structure stored for the computer node, and appending the new network identity information to the data structure stored for the computer node. For example, if a key server computer receives an update message comprising the previous network identity information and the new network identity information for a particular computer node, then the key server computer may retrieve a list of valid network identities for a group, delete the previous network identity information from the list, and append the new network identity information to the list.

For purposes of illustrating clear examples, FIG. 4 depicts the update message in two formats depicted as message 400, 470. In other embodiments, other types and formats of the update message may be implemented.

In an embodiment, an update message 400 comprises a header field 410, a previous address field 420, a new address field 430, a group identifier field 440 and an integrity check field 450.

The header field 420 may be used to store header information of an update message and may be used to forward the update message from a computer node to a destination, such as a key server computer. The header information may comprise an address or any type of identifier of the computer node, an address or any type of identifier of the key server computer, and routing and communications protocol-related information.

The previous address field 420 may be used to store a value that represents a previous network identifier associated with a group member and registered with a key server computer. A previous network identifier may correspond to previous (old) identification information provided by the group member to the key server computer, and may be represented as an IP address, a MAC address, or any other identifier assigned to the group member. For example, if a particular group member received from a DHCP a particular IP address, and the particular IP address was the previous address registered with the key server computer, then the previous address field 420 may store the particular IP address.

The new address field 430 may be used to store a value that represents a new network identifier associated with the group member. A new network identifier may correspond to new identification information that a group member wishes a key server to use instead of the previous network identity in communications with the group member. A new address may be represented as a new IP address, a new MAC address, or any other new identifier assigned to the group member. The key server computer may use the new address to replace the previous address in a list of active group members, and to forward messages, such as rekeying messages, to the group member.

The group identifier field 440 may be used to store a group identifier of the group to which a group member belongs. A group identifier is an identifier that uniquely identifies a membership group. Non-limiting examples of the groups include GDOI-based VPN groups, and other membership groups that may be identified in a network.

The integrity check field 450 may be used to store a value that may be used by a key server computer to authenticate the update message 400. An integrity check value may be derived from the contents of the update message 400. Other methods of computing the integrity check values may also be implemented.

As depicted in FIG. 4, the update message 400 does not include secret information. However, other types of update message may comprise some secret data. An example of such an update message is depicted in the update message 470 of FIG. 4.

The update message 470 comprises a header field 410, a previous address field 420, a new address field 430, a group identifier field 440, a secret field 445, and an integrity check field 450.

The secret field 445 may be used to store secret information shared between a group member and a key server computer. The secret information may be represented as a cookie, the result of using a public key, the result of using a private key, the result of using a secret key, an alphanumeric string, a computer code, or any other type of information that the group member and the key server computer have exchanged, and that the key server computer may use to unequivocally identify the group member. For example, if the secret information is a particular cookie that a particular group member and a key server computer exchanged during a registration of the particular group member, then the key server computer may use the particular cookie to determine whether the update message was received from a valid group member.

5.0 Example of Communications Between Group Members and Servers

Figure 5:
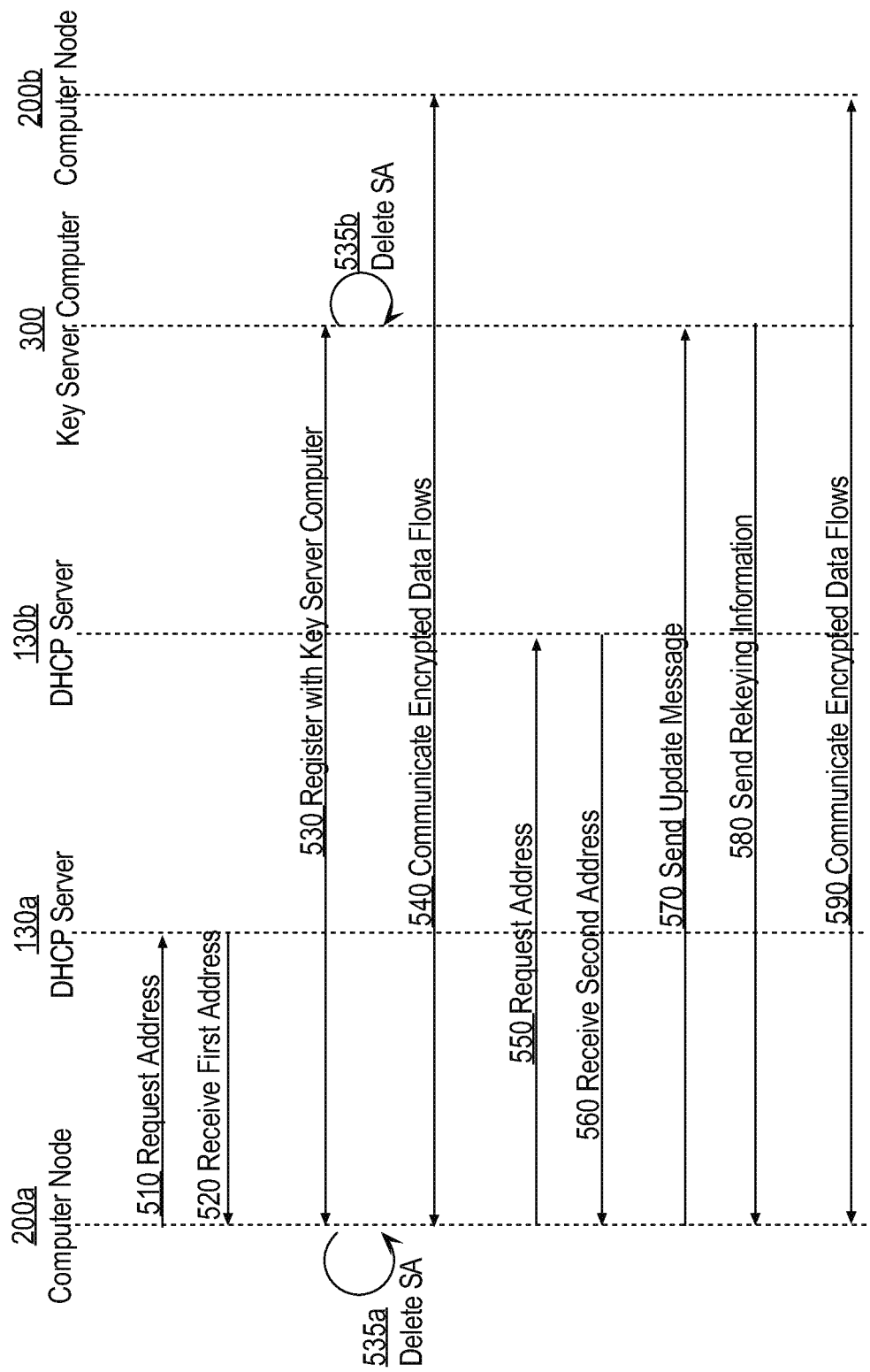
FIG. 5 illustrates an example of communications between group members and servers.

FIG. 5 illustrates an example of communications between group member computer nodes 200a-200b and servers, such as DHCP servers 130a-130b and a key server computer 300.

In step 510, computer node 200a requests DHCP server 130a to provide first network identity information, such as a first network address. In step 520, computer node 200a receives the first network address from DHCP server 130a. In an embodiment, the first network address may be an IP address leased or assigned by DHCP server 130a to computer node 200a. Computer node 200a may use the first network address as a sender address in communications sent by computer node 200a to other group members.

In step 530, computer node 200a registers the first network address with key server computer 300. Registration process may involve exchanging several messages between computer node 200a and key server computer 300 that may include keying information, such as shared group encryption keys, that computer node 200a may use to encrypt or decrypt messages subsequently communicated to or from computer node 200b.

Furthermore, registration may include establishing an authentication SA between computer node 200a and key server computer 300. For example, key server computer 300 may generate an SA entry (such as an entry 305 of FIG. 3) in a SA database for the SA, associate the first network address with the SA in the SA entry, and place the first network address in a current address field 310.

In an embodiment, registration may also include establishing an entry in a SA database maintained by computer node 200a. For example, computer node 200a may generate an SA entry (such as an entry 305 of FIG. 3) in a SA database for the SA, associate the first network address with the SA, and place the first network address in a current address field 310. Moreover, computer node 200a may associate the keying information with the SA in the SA database entry.

In addition to creating an authentication SA between computer node 200a and key server computer 300, the computer node may establish a local group confidentiality SA, which the computer node may use to communicate with other group members, such as a computer node 200b. For example, computer node 200a may generate an entry in SA database for the local group SA and associate the first network address with this SA, so that the first network address may be used in communications with other members of the group. In addition, computer node 200a may associate the keying information with the local group SA in the local group SA database entry to cause information transferred from the computer node to members of the group to be encrypted using the keying information.

In an embodiment, a key server computer 300 is a stateless key server. Upon finishing a registration process of computer node 200a, in step 535b, the stateless key server computer 300 deletes or tears down the SA entry for the computer node in the SA database maintained by key server computer 300.

In an embodiment, a computer node 200a is stateless. Upon finishing registration, in step 535a, the stateless computer node 200a deletes or tears down the SA entry for the computer node in the SA database maintained by the computer node.

In this context tearing down may include deleting and sending a notification to another that the SA was destroyed. Alternatively a node may delete the SA after a particular time after completing registration Different nodes may use different time duration, and notification is optional.

Tearing down the SA entry may release resources of key server computer 300 and computer node 200a such as memory or storage.

For example, deleting or tearing down each SA may provide significant benefits to the key server computer, which otherwise might have to store SA entries for a large number of group member nodes, consuming extensive memory or disk storage.

In step 540, computer node 200a communicates encrypted data flows to other computer nodes, such as computer node 200b. The data flows may be encrypted using the keying information that computer node 200a received from key server computer 300 in step 530, described above.

In an embodiment, computer node 200a is mobile node and may leave a first sub-network, serviced by DHCP server 130a, and move into a second sub-network, serviced by DHCP server 130b.

In response, in step 550, computer node 200a requests second network identity information, such as a second network address, from DHCP server 130b, and, in step 560, receives the second network address from DHCP server 130b. In an embodiment, the second network address may be a different IP address assigned by DHCP server 130b to computer node 200a. Computer node 200a may use the second network address as a sender address in communications sent by computer node 200a to other group members.

In an embodiment, if computer node 200a maintains a SA database, then computer node 200a may replace a first network address with a second network address in a SA entry in the SA database. The replacing may cause computer node 200a to start using the second network address, instead of using the first network address, in communicating with other devices in the network.

In an embodiment, replacing a first network address with a second network address in a SA database maintained by computer node 200a does not involve registering the second network address with key server computer 300. Instead, the replacing the first network address with the second address in the SA database enables computer node 200a to utilize the second network address in communications with other nodes, such as key server computer 300, computer node 200b, DHCP servers and other network devices.

In step 570, computer node 200a creates and sends an update message to key server computer 300 as described herein for FIG. 4.

By creating and sending an update message, computer node 200a notifies key server computer 300 that reachability information of computer node 200a has changed. In the embodiment depicted in FIG. 4, an update message may include a first network address stored in the previous address field 420, and a second network address stored in the new address field 430.

In response to receiving an update message from computer node 200a, key server computer 300 parses the update message to identify data included in the message, and extracts at least a group identifier, a previous network address and a new network address from the update message. Furthermore, key server computer 300 may retrieve a list (or a table, or any other data structure) of valid group members. Using the group identifier for computer node 200a, key server computer 300 may determine an entry in the list containing network identity information for the computer node, and replace, in the entry, the previous network address for the computer node with the new network address for the computer node. Once the replacement is completed, key server computer 300 may start using the new network address in communicating with computer node 200a.

In an embodiment, if key server computer 300 maintains an authentication SA for computer node 200a, then the key server computer may use a new address from an update message to replace the value stored in a current address field 310 in an SA entry, as depicted in FIG. 3. Once the replacement is completed, key server computer 300 may start using the new network address in communicating with computer node 200a.

In an embodiment, if key server computer 300 does not maintain an authentication SA for computer node 200a, then the key server computer may retrieve a list of current group members for the group identified by a group identifier stored in the group identifier field 440 in the update message 400 of FIG. 4, locate a previous address of the computer node on the list, and replace the previous address on the list with a new address, stored in the new address field 430. Once the replacement is completed, key server computer 300 may start using the new network address in communicating with computer node 200*a*.

If for some reason security policy for computer node 200*a*, or a group to which the computer node belongs, changes, then in step 580, key server computer 300 may generate and send rekeying information to the computer node.

Rekeying information may include new encryption keys that computer node 200*a* may use to encrypt and decrypt information exchanged with key server computer 300 and other group members.

Rekeying information may be sent to computer node 200*a* according to the most up-to-date network address information provided to key server computer 300 by the computer node. For example, rekeying information may be sent to a current address stored in a current address field 310 (depicted in FIG. 3) in a SA entry for the computer node maintained in a state database by key server computer 300. The current address may correspond to a first network address if computer node 300 has not updated its own network address, or may correspond to a second network address if computer node 300 has updated its own network address to the second network address.

Upon receiving rekeying information from key server computer 300, computer node 200*a* may replace the previously received keying information stored in a SA entry in a SA database maintained by the computer node with the currently received rekeying information. Furthermore, computer node 200*a* may update the keying information contained in a SA entry associated with a local group SA for a membership group. Subsequently, computer node 200*a* may begin using the new keying information to encrypt and decrypt messages exchanged with other nodes in the network. For example, data flows communicated in step 590 may be encrypted using the new keying information, and upon receiving the encrypted data flows in step 590, both computer node 220*a* and computer node 220*b* may use the new keying information to decrypt the received messages.

6.0 Example Method for Changing Group Member Reachability Information

Figure 6:
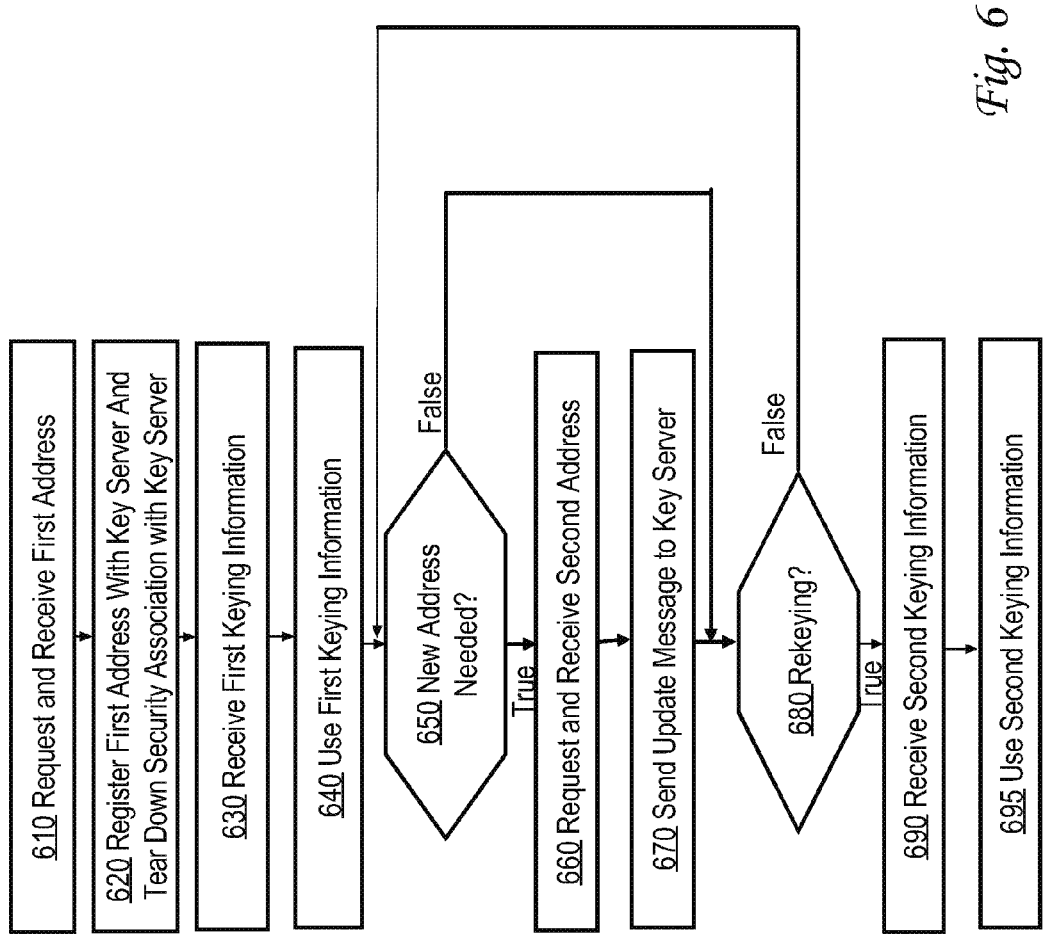
FIG. 6 illustrates an example method for changing group member reachability information.

FIG. 6 illustrates an example method for changing group member reachability information. In an embodiment, the method is implemented as an extension to a DGVPN, and allows a computer node to notify a key server computer that the computer node has changed its own network identity. The updating group member reachability may be performed without causing the key server computer to establish a new SA each time the computer node changes the network identity.

In step 610, a computer node requests and receives a first network address. A computer node may send a request to a DHCP server and receive the first network address from the server. Alternatively, the computer node may be preconfigured with the first network address by a system administration. Similar steps of requesting and receiving the first network address are described herein for steps 510-520 of FIG. 5.

In step 620, the computer node registers the first network address with a key server computer. This registration may involve generating a registration message containing the first network address and a group identifier of the group which the computer node would like to join, and forwarding the registration message to the key server computer. Non-limiting examples of groups are VPN groups, DGVPN groups, user groups or any other groups that may register with the key server computer.

During the registration process, the key server computer may create a pairwise SA for the computer node, and thus establish a secure communications channel between the key server computer and the computer node. An example registration process is further described herein for step 530 of FIG. 5.

Registration of the first network address with a key server computer may cause the key server computer to add the first network address, associated with the computer node, to a list of valid network identities of group members that belong to a particular membership group. The particular membership group may be identified in a registration request that the computer node sent to the key server computer. For example, in the registration request, the computer node may provide a group identifier, such as a group identifier 320, as described for FIG. 3.

Registration of the first network address of the computer node with the key server computer may also cause the key server computer to create a GSA for the computer node, store the GSA in storage accessible to the key server computer, and transmit to the computer node the GSA. In an embodiment, the GSA may be used by the key server computer to encrypt keying information before sending it to the computer node, and may be used by the computer node to decrypt the keying information received from the key server node.

In an embodiment, at a conclusion of a registration process, the SA may be deleted or torn down, as described herein for steps 535*a-b* of FIG. 5.

In step 630, the computer node receives first keying information from the key server computer. The first keying information may be a public key that the computer node may use to encrypt outgoing messages and decrypt incoming messages. Alternatively, the first keying information may be any type of encryption key that the group members share to secure messages sent to each other.

In an embodiment, first keying information may be encrypted using a GSA, as described for step 620. Upon receiving the encrypted first keying information, the computer node may decrypt it using the GSA to obtain the decrypted first keying information, and store the decrypted first keying information in storage accessible to the computer node.

In step 640, the computer node generates data flows to other group members and encrypts the generated data flows using the first keying information. For example, the computer node may generate a message intended to another group member, encrypt that message using the first keying information, such as a public encryption key, and transmit the encrypted message to the group member. The computer member may also receive an encrypted message from another group member, decrypt that message using the first keying information (or a private key associated with a public key distributed in the first keying information), and store the decrypted message for further processing.

In step 650, the computer node determines whether to acquire a new network identity. The computer node may acquire a new network identity if the computer node changed its location and thus the old network identity may be invalid. If the new address is needed, then the process proceeds to step 660; otherwise, the process proceeds to step 680.

In step 660, the computer node requests and receives a second network address. The second network address may be received from the same DHCP server which provided a first network identity to the computer node, or from another DHCP server. Alternatively, the second network address may be received from a system administrator. Requesting and receiving the second network address is further described herein for steps 550-560 of FIG. 5.

In step 670, the computer node sends an update message to the key server computer to notify the key server computer that the computer node has changed the identity. For example, the computer node may send an update message to indicate that the computer node changed its own address from a first network address to a second network address.

Upon receiving the update message, the key server computer validates the update message. For example, the key server computer may determine whether the message was sent by a valid group member. This may be accomplished by comparing a group identifier, included for example, in the group identifier field 440 described in FIG. 4, with the valid group member identifiers.

In an embodiment, the key server computer authenticates the update message. For example, the update message may comprise a pair-wise secret used with a MAC or encryption algorithm. If the key server computer provides support for the LKH algorithm, then the key server computer may distribute such a pair-wise secret to each group member, and use the pair-wise secret in determining whether the update message was sent by a valid group member.

If the update message is not authentic, then the key server computer may discard the update message. For example, an update message may be sent from a node that provided an incorrect group identifier, or from a node that is spoofing a legitimate group member.

In an embodiment, sending the update message to the key server computer does not cause the key server computer to create a new pairwise SA for the computer node. As described above, sending the update message allows omitting the need to create the new pairwise SA for the computer node.

In an embodiment, upon receiving the update message comprising a second network address, the key server computer may start using the second network address to send any future rekeying information to the computer node. For example, the key server computer may start using the second network address, instead of a first network address, to send rekeying information when such information becomes available for the computer node.

In an embodiment, the update message is implemented as a GROUP_UPDATE message and as an extension to a DGVPN.

If the update message comprises a secret stored in a secret field 445, as described for the update message 470 in FIG. 4, then the key server computer may use the secret in determining whether the update message was sent by a valid group member. The shared secret may be a cookie, which may be hashed (or not), and used to indicate a valid group member. Details of using the secret by the key server computer are further described herein in connection with FIG. 4.

In an embodiment, the update message comprises additional fields that may be used by the key server computer in determining whether the update message was sent by a valid group member. For example, the update message may comprise a nonce field or a timestamp field, each of which the key server computer may use as a code, an identifier or a part of an identifier to identify a valid group member.

In an embodiment, the update message comprises a limit field and a warning alert field which may be structured and used as described herein in connection with FIG. 3.

In step 680, the key server computer determines whether to create new keying information. For example, the key server computer may determine that integrity of the previously distributed keying information has been compromised, and subsequently create new keying information. According to another example, the key server computer may suspect that integrity of some group members has been compromised, and thus create new keying information.

If in step 680 the process requests new keying information, then the process proceeds to step 690; otherwise, the process continues using the previous keying information in processing communications exchanged with other group members, and proceeds to step 640.

In step 690, the computer node receives second rekeying information. The second rekeying information may be forwarded to the computer node in a rekey message, which may specify the most current network address as a destination for the message. The rekeying information may comprise pair-wise keys, public keys, private keys and any other types of security keys.

In step 695, the computer node starts using second keying information in processing communications exchanged with other group members. For example, the computer node may start using the second keying information to encrypt the communications sent to other group members, and to decrypt the communications received from other group members.

In an embodiment, the approach depicted in FIG. 6 is applicable to both dynamically addressed and statically addressed computer nodes. For example, if a computer node uses dynamic addressing, then the computer node performs steps 610-695, which enables the key server computer to interoperate with the computer node using its then-current network identity.

If a computer node uses static addressing, then the computer node may be configured to perform steps 610-650 and 680-695. Such a computer node uses one network identity, and a key server computer sends keying and rekeying information to the computer node using the one network identity of the computer node. Therefore the approach depicted in FIG. 6 is backward compatible with static addressing.

7.0 Example Method for Changing Group Member Reachability Information

Figure 7:
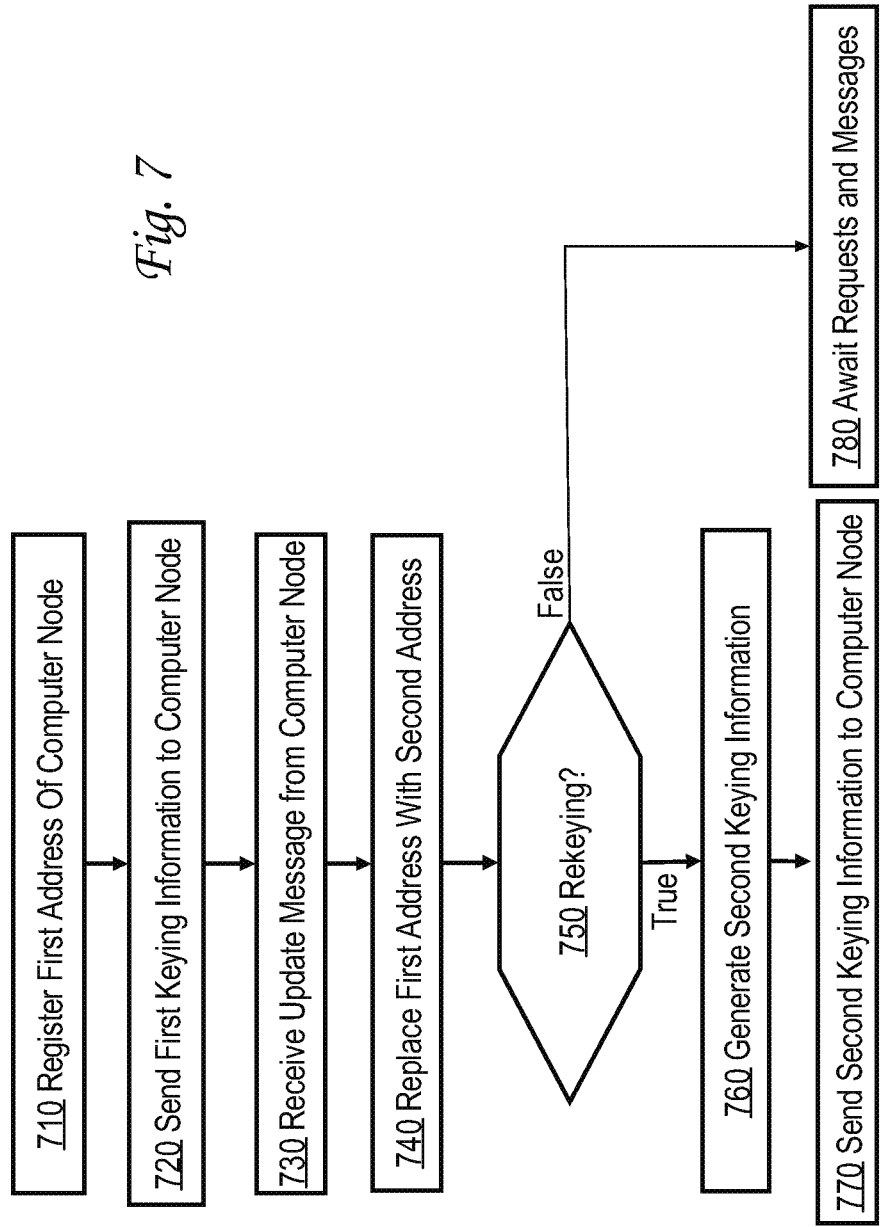
FIG. 7 illustrates an example method for changing group member reachability information.

FIG. 7 illustrates an example method for changing group member reachability information. In an embodiment, the method is implemented as an extension to a DGVPN, and allows a key server computer to update group member reachability information of a group member computer node without causing the key server computer to establish a new SA each time the computer node changes the network identity.

In step 710, the key server computer receives a registration request from the computer node, and registers the computer node to a membership group as in step 620 of FIG. 6.

In step 720, the key server computer sends the computer node first keying information of the type in step 630 of FIG. 6.

In step 730, the key server computer receives an update message from the computer node. In an embodiment, the update message comprises a first network address and a second network address associated with the computer node. Various types of an update message and various types of processing of the update message are further described herein for step 670 of FIG. 6.

In step 740, the key server computer retrieves an identity data structure that is used to store valid network identities of group members, identifies an entry in the identity data structure associated with the computer node, and replaces the previous network identity with the current network identity for the computer node. For example, if a key server computer registered the computer node using a first network address, and the computer node changes the first network address to a second network address, then the key server computer may replace the first network address in the identity data structure with the second network identity in the entry associated with the computer node.

As described above, upon receiving the update message, the key server computer does not create or establish a new SA for the computer node.

In step 750, the key server computer determines whether rekeying information may be needed by one or more computer nodes. Various instances when the rekeying information may be distributed to the computer nodes are further described herein for step 680 of FIG. 6.

If in step 750 the key server computer determined that rekeying information may be needed by one or more computer nodes, then the process proceeds to step 760; otherwise, in step 780, the process awaits new requests, such as registration requests, and new messages, such as update messages.

In step 760, the key server computer generates new keying information for one or more group member computer nodes, and in step 770, the key server computer sends the new keying information to the computer node(s). Generating and distributing second keying information is further described herein for step 690 of FIG. 6.

In an embodiment, an approach is presented for a group member computer node to securely report a change of the network identity of the node to a key server computer without causing the key server computer to create new SA each time the change is reported. The approach may be particularly applicable to DGVPN computer nodes, and especially to the mobile DGVPN computer nodes. The approach may be viewed as an extension to a DGVPN, and provides backward compatibility with the legacy DGVPNs. Therefore, the approach may support those group member computer nodes that dynamically change and update their network identities, as well as those group member computer nodes that have associated static network identities.

In an embodiment, an approach allows updating group member reachability information using minimal amounts of bandwidth and computational resources. For example, implementing a GROUP_UPDATE message in a DGVPN allows communicating the group member reachability information without a need to disconnect and then reconnect a group member to the group each time the update information is received from the group member.

8.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
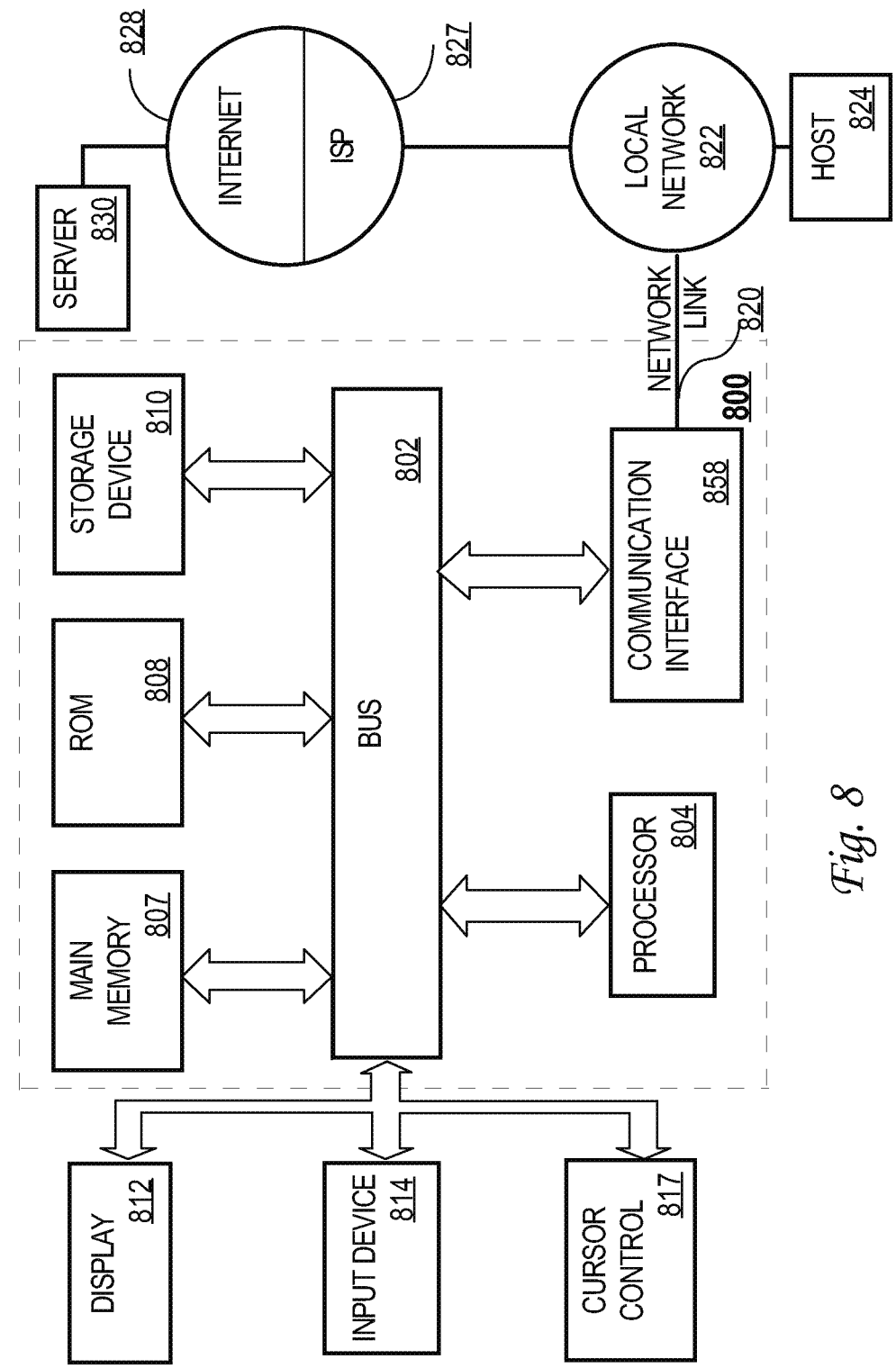
FIG. 8 illustrates an example computer system with which an embodiment may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 807 such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (LCD, CRT), for displaying information to a computer user. An input device 814, including alphanumeric and other keys, is coupled to bus 802 for communicating information and command selections to processor 804. Another type of user input device is cursor control 817 such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 858 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 827 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8.0 Extensions and Alternatives

In the foregoing specification, embodiments of the invention have been described with reference to numerous specific details that may vary from implementation to implementation. The specification and drawings are, accordingly, to be regarded in an illustrative rather than a restrictive sense.

What is claimed is:

1. A method for enhancing capabilities of a key server computer to dynamically disseminate rekeying information to mobile devices, the method comprising:
   a key server computer registering a first network address associated with a mobile device, and upon finishing the registering of the first network address, deleting a security association established for the mobile device;
   receiving, from the mobile device, an update message comprising both the first network address and a second network address of the mobile device;
   in response to receiving the update message, the key server computer replacing the first network address with the second network address in storage at the key server computer without establishing a new secure connection with the mobile device;
   the key server computer generating rekeying information in response to determining that the rekeying information is needed for the mobile device.

2. The method of claim 1, wherein upon receiving the update message, the key server computer does not establish a new secure connection with the mobile device.

3. The method of claim 1,
   wherein the update message further comprises a secret shared between the mobile device and the key server computer;
   wherein the secret is any type of information that is unique to the mobile device or a group to which the mobile device belongs.

4. The method of claim 1, further comprising:
   upon registering the mobile device, the key server computer sending first keying information to the mobile device;
   wherein the first keying information is secured using a group authentication security association (GSA);
   wherein the mobile device accepts the first keying information using the GSA.

5. The method of claim 1, wherein the key server computer determines that the rekeying information is needed for the mobile device when the key server computer determines that a security policy for the mobile device has changed.

6. The method of claim 1, wherein the key server computer determines that the rekeying information is needed for the mobile device when the key server computer receives an indication that a security association maintained by the mobile device is about to expire.

7. The method of claim 1, wherein the key server computer replaces the first network address with the second network address in an identity data structure maintained by the key server computer for the mobile device.

8. A non-transitory computer-readable storage medium storing one or more sequences of instructions which, when executed by one or more processors, cause the one or more processors to perform:
registering a first network address associated with a mobile device, and upon finishing the registering of the first network address, deleting a security association established for the mobile device;
receiving, from the mobile device, an update message comprising both the first network address and a second network address of the mobile device;
in response to receiving the update message, replacing the first network address with the second network address in storage at a key server computer without establishing a new secure connection with the mobile device;
generating, at the key server computer, rekeying information in response to determining that the rekeying information is needed for the mobile device.

9. The non-transitory computer-readable storage medium of claim 8,
wherein execution of the instructions that cause receiving the update message does not cause the key server computer to establish a new secure connection with the mobile device.

10. The non-transitory computer-readable storage medium of claim 8,
wherein the update message further comprises a secret shared between the mobile device and the key server computer;
wherein the secret is any type of information that is unique to the mobile device.

11. The non-transitory computer-readable storage medium of claim 8, further comprising instructions which, when executed, cause:
upon registering the mobile device, sending first keying information to the mobile device;
wherein the first keying information is secured using a group authentication security association (GSA);
wherein the mobile device accepts the first keying information using the GSA.

12. The non-transitory computer-readable storage medium of claim 8, wherein the rekeying information is needed for the mobile device when the key server computer determines that a security policy for the mobile device has changed.

13. The non-transitory computer-readable storage medium of claim 8, wherein the key server computer determines that the rekeying information is needed for the mobile device when the key server computer receives an indication that a security association maintained by the mobile device is about to expire.

14. The non-transitory computer-readable storage medium of claim 8, wherein the first network address is replaced with the second network address in an identity data structure maintained by the key server computer for the mobile device.

15. A key server device, comprising:
a communication manager that:
registers a first network address associated with a mobile device, and upon finishing the registering of the first network address, deletes a security association established for the mobile device;
receives, from the mobile device, an update message comprising both the first network address and a second network address of the mobile device;
a key manager that:
in response to receiving the update message, replacing the first network address with the second network address in storage at a key server computer without establishing a new secure connection with the mobile device;
generating, at the key server computer, rekeying information in response to determining that the rekeying information is needed for the mobile device.

16. The key server device of claim 15,
wherein the communication manager does not establish a new secure connection with the mobile device upon receiving the update message from the mobile device.

17. The key server device of claim 15,
wherein the update message further comprises a secret shared between the mobile device and the key server device;
wherein the secret is any type of information that is unique to the mobile device.

18. The key server device of claim 15,
wherein the key manager sends first keying information to the mobile device upon registering the mobile device;
wherein the first keying information is secured using a group authentication security association (GSA);
wherein the mobile device accepts the first keying information using the GSA.

19. The key server device of claim 15, wherein the rekeying information is needed for the mobile device when the key manager determines that a security policy for the mobile device has changed.

20. The key server device on claim 15, wherein the key manager determines that the rekeying information is needed for the mobile device when the key manager receives an indication that a security association maintained by the mobile device is about to expire.

* * * * *